(12) United States Patent
Becht et al.

(10) Patent No.: US 8,222,812 B2
(45) Date of Patent: Jul. 17, 2012

(54) ELECTRIC LAMP WITH AN OUTER BULB AND A BUILT-IN LAMP AND ASSOCIATED PRODUCTION METHOD

(75) Inventors: Roland Becht, Dorlisheim (FR); Eric Korndoerfer, Herbrechtingen (DE)

(73) Assignee: Osram AG, Munich (DE)

( * ) Notice: Subject to any disclaimer, the term of this patent is extended or adjusted under 35 U.S.C. 154(b) by 0 days.

(21) Appl. No.: 13/041,468

(22) Filed: Mar. 7, 2011

(65) Prior Publication Data

US 2011/0221337 A1 Sep. 15, 2011

(30) Foreign Application Priority Data

Mar. 11, 2010 (DE) .......................... 10 2010 002 769

(51) Int. Cl.
*H01K 1/40* (2006.01)
*H01K 3/12* (2006.01)
*H01K 1/38* (2006.01)
*H01J 5/46* (2006.01)
*H01J 9/00* (2006.01)

(52) U.S. Cl. .............. 313/579; 313/318.09; 313/318.04; 445/27

(58) Field of Classification Search ........................ None
See application file for complete search history.

(56) References Cited

U.S. PATENT DOCUMENTS

| | | | |
|---|---|---|---|
| 4,717,852 A | 1/1988 | Dobrusskin et al. | |
| 7,341,469 B2 * | 3/2008 | Frye | 439/236 |
| 2006/0077648 A1 * | 4/2006 | Stark | 362/10 |
| 2011/0235344 A1 * | 9/2011 | Stark | 362/374 |

FOREIGN PATENT DOCUMENTS

| | | |
|---|---|---|
| DE | 3232207 A1 | 3/1984 |
| WO | 2009156251 A2 | 12/2009 |

* cited by examiner

*Primary Examiner* — Ashok Patel

(57) ABSTRACT

In various embodiments, an electric lamp is provided, which may include an outer bulb and a base fastened thereto and a longitudinal axis, the bulb surrounding a built-in lamp, which is equipped with a pinch seal with two narrow sides and two broad sides, from which at least one outer power supply line protrudes, the feed line being held in a plate-like stand, the built-in lamp being held in the outer bulb by a cementless connecting means in the form of a mounting clip, wherein a connection between an outer power supply line and a feed line is ensured by virtue of the fact that a first one of these two component parts is bent back in the form of a bow, while the second of these component parts is bent back in the manner of a loop and is suspended in the bow.

12 Claims, 4 Drawing Sheets

ELECTRIC LAMP WITH AN OUTER BULB AND A BUILT-IN LAMP AND ASSOCIATED PRODUCTION METHOD

CROSS-REFERENCE TO RELATED APPLICATION

This application claims priority to German Patent Application Serial No. 10 2010 002 769.3, which was filed Mar. 11, 2010, and is incorporated herein by reference in its entirety.

TECHNICAL FIELD

Various embodiments are based on a lamp. Various embodiments relate e.g. to an electric lamp with a base, e.g. a lamp consisting of a built-in lamp arranged in an outer bulb, the base being electrically conductively connected to power supply wires. Various embodiments relate e.g. to an electric lamp with a base at one end and with an outer bulb held in a base and at least one built-in lamp arranged within the outer bulb. Such halogen incandescent lamps are intended e.g. for operation on a high voltage (HV) of typically 100 to 250 V.

BACKGROUND

WO-A 2009156251 has disclosed a holder for a built-in lamp in an outer bulb, the holder having a metallic mounting clip, which rests on the end of the plate-like stand.

In general, in this case the outer power supply lines passed out of the built-in lamp are connected fixedly to the feed lines protruding out of the plate-like stand for locking purposes. In this case, complex machine technology is required.

SUMMARY

In various embodiments, an electric lamp is provided, which may include an outer bulb and a base fastened thereto and a longitudinal axis, the bulb surrounding a built-in lamp, which is equipped with a pinch seal with two narrow sides and two broad sides, from which at least one outer power supply line protrudes, the feed line being held in a plate-like stand, the built-in lamp being held in the outer bulb by a cementless connecting means in the form of a mounting clip, wherein a connection between an outer power supply line and a feed line is ensured by virtue of the fact that a first one of these two component parts is bent back in the form of a bow, while the second of these component parts is bent back in the manner of a loop and is suspended in the bow.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
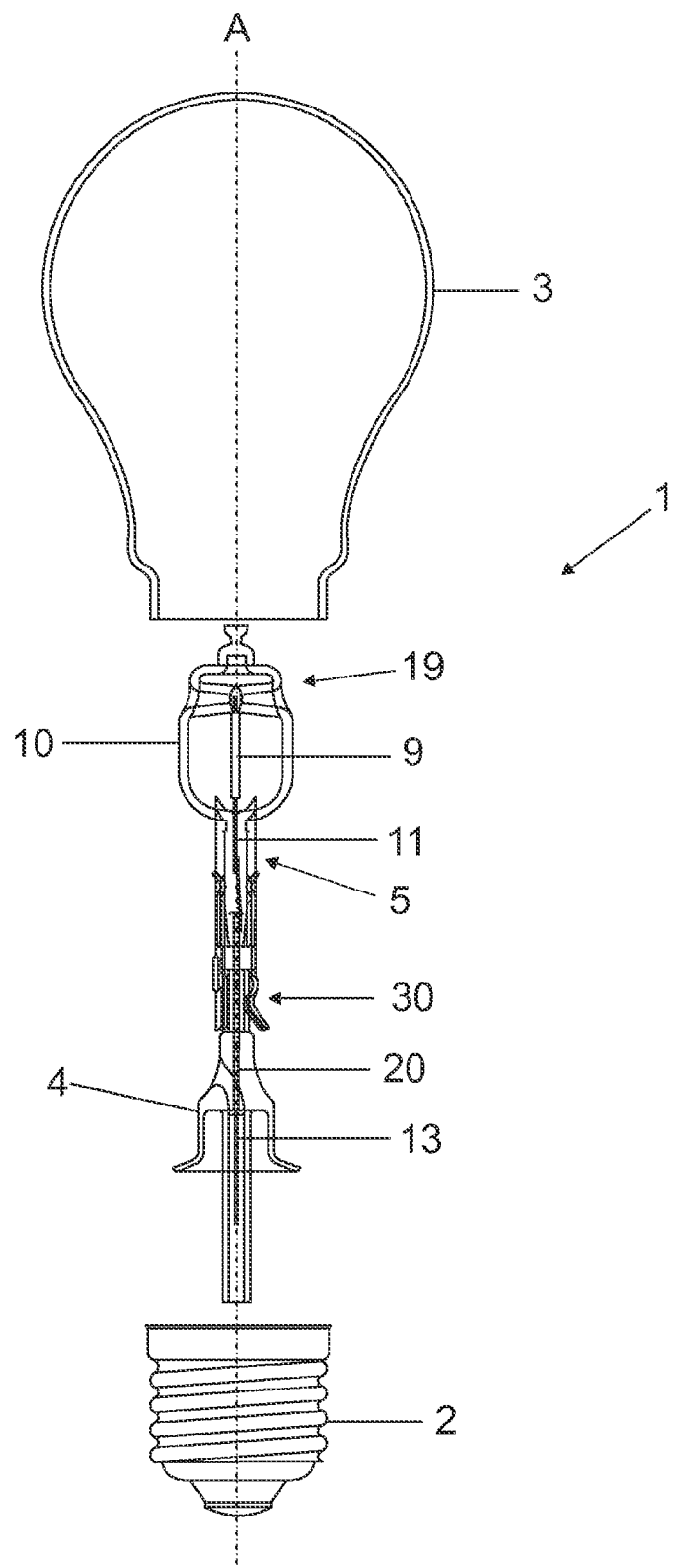
FIG. 1 shows a basic illustration of a lamp according to various embodiments in a side view.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments make the fitting of a built-in lamp in an outer bulb by means of a mounting clip in a lamp secure and reliable, but nevertheless simple.

As a move away from a highly automated process a novel fitting concept is now proposed which manages without any complex adjustment.

Various embodiments ensure the simple and reliable production of a lamp with a built-in lamp. Various embodiments e.g. provide an electric lamp with a base at one end and with an outer bulb fastened to a base and a built-in lamp arranged within the outer bulb, it being possible for said electric lamp to be produced in a robust and simple manner. In various embodiments, the lamp or built-in lamp is a high-voltage halogen incandescent lamp, wherein at least two pins act as power supply wires. However, the lamp can also be a high-pressure discharge lamp.

The lamp or built-in lamp consists substantially of a hermetically sealed lamp vessel or bulb with a pinch seal, of at least one light-emitting means (filament or arc between two electrodes) and a power supply system for the light-emitting means, which system generally has two outer power supply lines, which protrude out of the pinch seal axially parallel to one another. The light-emitting means is normally a light-emitting element, but may also be a discharge arc between two electrodes. The light-emitting means will always be described below as a light-emitting element, for reasons of simplicity. It is connected to the outer power supply lines via inner power supply lines and possibly foils.

The power supply system connects the light-emitting element arranged in the interior of the lamp vessel to a base, which is arranged outside the lamp vessel and which is intended to be connected to a power source. The power supply system consists, for example, of inner power supply wires, of fuse-sealed foils and of outer power supply wires, wherein the mutually aligned ends of the inner and outer power supply wires and the fuse-sealed foils connecting the power supply wires to one another are fuse-sealed in the lamp pinch seal. Only the pinch seal and the wires of the outer power supply lines which protrude outwards therefrom are relevant for the various embodiments. The bulb is generally filled with an inert gas and a halogen additive. Instead of an incandescent lamp, it is also possible to use a high-pressure discharge lamp e.g. as the built-in lamp, in a manner similar to that described in DE-A 32 32 207.

In various embodiments, the power supply lines are connected to the base-side feed lines in such a way as to purely make contact.

In this case, the outer power supply lines are bent back towards the built-in lamp, e.g. in the form of a bow towards the narrow sides of a pinch seal which seals off the built-in lamp. The bend in the bow is often U-shaped or else V-shaped.

Similarly, the feed lines protruding out of the plate-like stand are bent back towards the plate-like stand. In this case too, a U-shaped or else V-shaped bend may be provided. The end of the bend is bent back relatively short and thus forms an open loop. It is important here that the end is free, in contrast to the situation for the outer power supply lines, which e.g. bear against the narrow sides.

Such an arrangement makes it possible to suspend the built-in lamp in a very simple manner with its two bows, which form closed loops, in the two open loops of the feed lines. In this way, electrical contact is achieved between the bow and the loop, with this electrical contact being brought about merely by touching contact.

The necessary mechanical fixing of the built-in lamp is achieved by a metal clip, as is known per se. Said metal clip fixes the pinch seal of the built-in lamp from below, e.g. using two fingers. In this case, the built-in lamp is held primarily mechanically by the clip. The power supply lines produce primarily an electrical connection and only secondarily a mechanical connection, in order that the built-in lamp cannot tip to the side and cannot fall out of the metal clip at the bottom.

In various embodiments, the role of the bow and the loop can be reversed, at least in terms of electrical contact.

A particular advantage of this fitting system is that the heat dissipation from the bulb is markedly reduced. This increases the energy efficiency e.g. in the case of the use of a built-in lamp. This applies e.g. when an IRC coating is used on the bulb. The system may be used in lamps with a low power of up to 150 W.

In detail, the outer power supply lines of the built-in lamp are bent back in the form of a U and then bear against a longitudinal side or preferably against a narrow side of the pinch seal. The feed lines, which protrude out of the plate-like stand, are bent in a first step through approximately 90° and threaded into the bow. Then, they are bent back further to 180° in a second step. In a third step, each loop is compressed, with the result that the two limbs of the wires protruding up from the plate-like stand move past one another over more than 180°.

A loop around the outer power supply line of the built-in lamp which holds said built-in lamp under tensile stress is thus produced. Therefore, even when the lamp is switched on and the thermal expansion associated therewith takes place, a secure electrical contact is ensured over the entire life of the lamp, ultimately caused by the prestress of the wires. The resilience of the wires owing to the bending is thus compensated for.

The interlocking connection between the bow and the loop when the loop is compressed produces a secure electrical connection. After the lamp has been switched on for the first time on HV or MV, the current flow ultimately also produces a cohesive connection, which in practice is equivalent to welding or at least comes close to this.

The advantage of the novel concept is that the production costs can thus be markedly reduced. Very high precision in the alignment of the component parts in order that they can be welded using a laser, as was previously the case, is no longer necessary. In various embodiments, simple resistance welding in the region between the bow and the loop may also be carried out for safety reasons. The fitting is a simple bending process, and therefore the necessary investment costs are also much lower than in a concept based on laser welding or the like. The simple concept also enables a very high throughput rate of typically 5000 units per hour.

FIG. 1 represents the lamp 1 as a whole. An outer bulb 3 is held in a base 2 of the conventional type E27 with a ceramic base insulator or lamp mount and a screw part fastened thereto. A built-in lamp 19 is arranged within the outer bulb 3. The built-in lamp is in the form of a so-called high-voltage halogen incandescent lamp and is known as such from the prior art. The lamp 1 has a longitudinal axis A.

The built-in lamp 19 (see also FIGS. 2 and 3) is equipped with a single pinch seal 5, which has two broad sides 6 and two narrow sides 7. Pin-like outer power supply lines 13 protrude out of the pinch seal 5. Said power supply lines are bent back in the form of a U onto the narrow sides of the pinch seal 5.

The built-in lamp 19 is, for example, a halogen incandescent lamp with a pinch seal at one end and with a lamp vessel 10. The light-emitting element 9 is electrically conductively connected to the base 2 via a power supply system. The power supply system may consist of inner power supply wires 11 connected to the light-emitting element 9, fuse-sealed foils 12 and outer power supply wires 13. Those ends of the inner power supply wires 11 which are remote from the light-emitting element 9, the fuse-sealed foils 12 and those ends of the outer power supply wires 13 which face the fuse-sealed foils are fuse-sealed in the pinch seal 5, which closes off the lamp vessel 10.

The lamp vessel 10 is filled with an inert gas and a halogen additive. At its end opposite the pinch seal 5, the lamp vessel 10 is fused (14). The lamp vessel 10 is thus hermetically sealed off from the outside.

Figure 2:
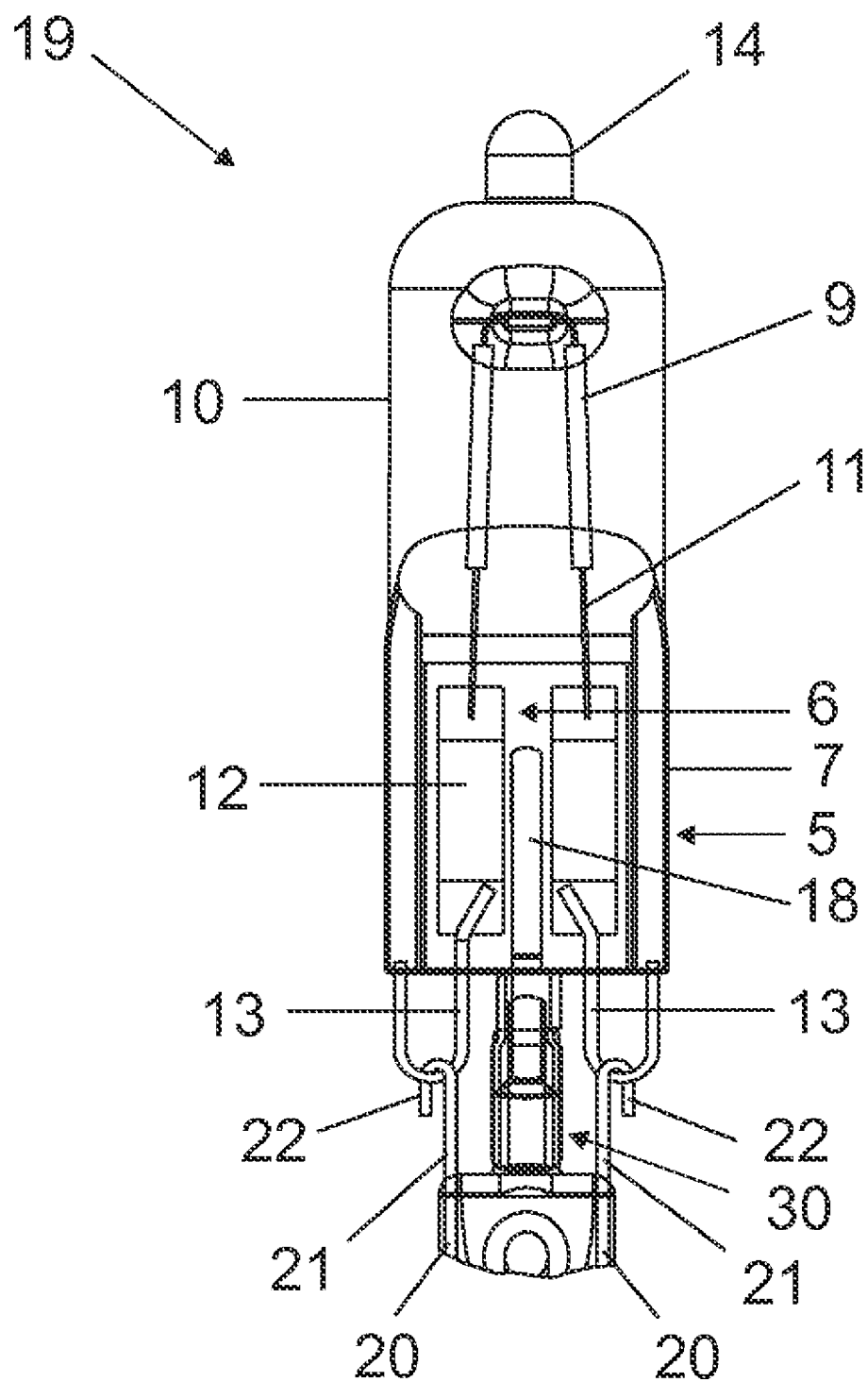
FIG. 2 shows a built-in lamp in detail with a mounting clip in a front view with suspended wires.
Figure 3:
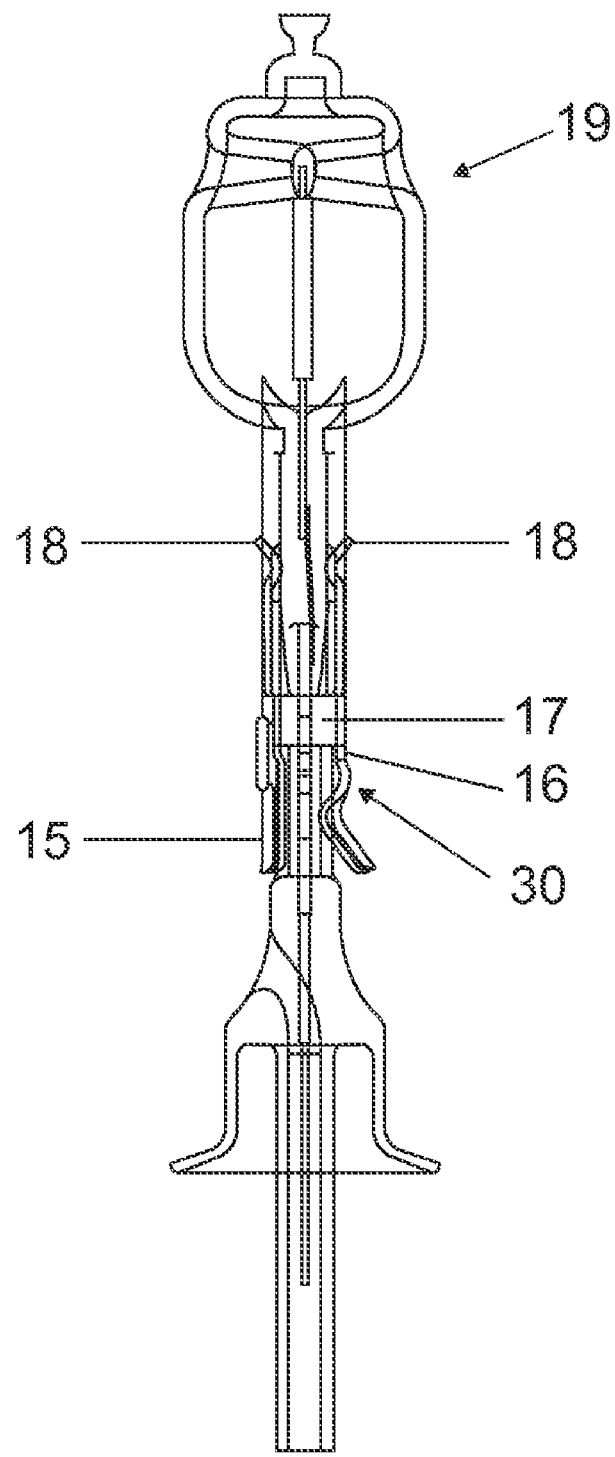
FIG. 3 shows a side view of the fitted built-in lamp.

The built-in lamp 19 is held by a pillar-like mounting clip 30 (see FIGS. 2 to 3). Said mounting clip 30 consists of two approximately identical parts 15 and 16, which are interlocked (17) with one another in a section, with each part 15, 16 having a finger 18, which protrudes up on a longitudinal side 6 of the pinch seal and rests there. The pinch seal 5 is fixed between the two fingers 18.

Independently of this, the built-in lamp 19 is electrically connected to the base 2 and its feed lines 20. This is performed by virtue of the fact that the free ends 21 of the feed lines 20, which protrude laterally out of a plate-like stand 4, as is known per se, are bent to form loops 22. These loops are bent back through 90° so as to fasten the built-in lamp 19.

Figure 4:
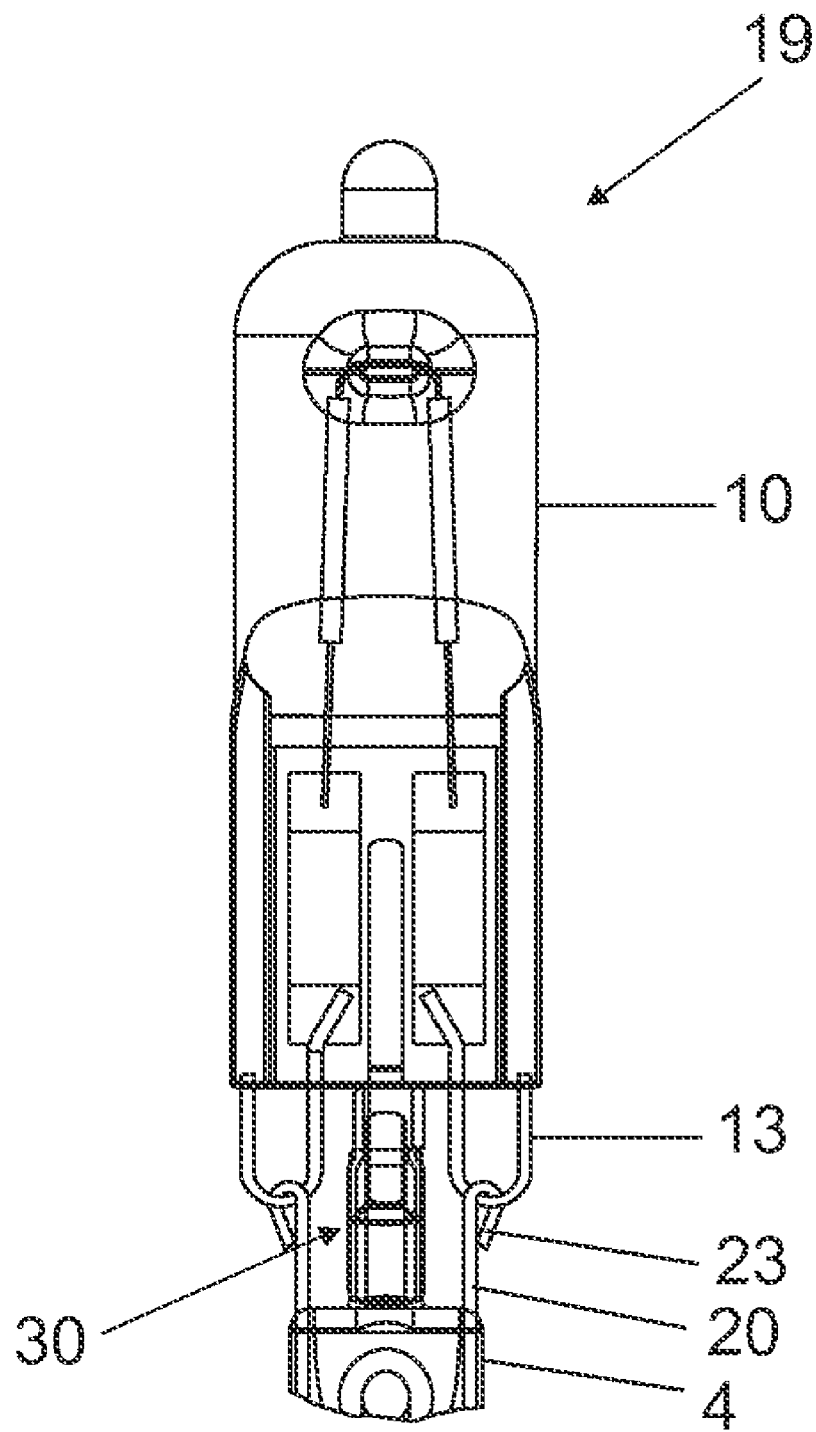
FIG. 4 shows a ready-fitted built-in lamp in the further exemplary embodiment with the loop formed.

FIG. 4 shows various embodiments, in which the loops are initially also bent back open (see FIG. 2) then the outer power supply lines 13 which are bent to form bows are suspended on the loops. The two parts of the mounting clip 30 consisting of stainless steel are positioned onto the plate-like stand 4 and connected to one another, with the result that the built-in lamp is fixed in its axial arrangement. Then, the loops as shown in FIG. 4 are bent back (23) to approximately 180° and possibly even slightly further and tensioned.

Finally, the two loops 23 are preferably each compressed, with the result that a secure electrical connection is produced which makes contact purely by an interlocking connection.

In various embodiments, an electric lamp is provided with an outer bulb and a base fastened thereto and a longitudinal axis, the outer bulb surrounding a built-in lamp, which is equipped with a pinch seal with two narrow sides and two broad sides, from which at least one outer power supply line protrudes, said outer power supply line being electrically conductively connected for its part to a feed line protruding up from the base, the feed line being held in a plate-like stand, the built-in lamp being held in the outer bulb by a cementless connecting means in the form of a mounting clip, wherein an electrical connection between an outer power supply line and a feed line is ensured by virtue of the fact that a first one of these two component parts is bent back in the form of a bow, while the second of these component parts is bent back in the manner of a loop and is suspended in the bow.

In an implementation of various embodiments, one of the two component parts may be compressed and therefore bear in clamping fashion against the other component part.

In an implementation of various embodiments, the outer power supply line may be bent back towards the pinch seal in the form of a bow, while the feed line may be bent back towards the base in the form of a loop.

In an implementation of various embodiments, the mounting clip may rest in the manner of a pillar on one end of the plate-like stand, e.g. on the exhaust tube, of the outer bulb.

In an implementation of various embodiments, the mounting clip may have two fingers which protrude up at the longitudinal sides of the pinch seal.

In an implementation of various embodiments, the feed line may be manufactured from steel, e.g. nickel-plated steel, and the outer power supply line may be manufactured from molybdenum. A typical diameter for the two is approximately 0.4 to 0.6 mm.

In an implementation of various embodiments, the lamp may be a halogen incandescent lamp, e.g. for operation on a high or medium voltage.

In various embodiments, a method for producing an electric lamp in accordance with various embodiments is provided, wherein, in a first step, the first of these two component parts is bent back in the form of a bow, while the second of these component parts is bent back through approximately 90° in the form of a loop, in a second step the built-in lamp is suspended on the loop, then the loop is bent back and suspended in the bow and in particular then one of the component parts is compressed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electric lamp, comprising:
an outer bulb and
a base fastened thereto and
a longitudinal axis,
the outer bulb surrounding a built-in lamp, which is equipped with a pinch seal with two narrow sides and two broad sides, from which at least one outer power supply line protrudes,
the outer power supply line being electrically conductively connected for its part to a feed line protruding up from the base, the feed line being held in a plate-like stand, the built-in lamp being held in the outer bulb by a cementless connecting means in the form of a mounting clip,
wherein an electrical connection between an outer power supply line and a feed line is ensured by virtue of the fact that a first one of these two component parts is bent back in the form of a bow, while the second of these component parts is bent back in the manner of a loop and is suspended in the bow.

2. The lamp as claimed in claim 1,
wherein one of the two component parts is compressed and therefore bears in clamping fashion against the other component part.

3. The lamp as claimed in claim 1,
wherein the outer power supply line is bent back towards the pinch seal in the form of a bow, while the feed line is bent back towards the base in the form of a loop.

4. The lamp as claimed in claim 1,
wherein the mounting clip rests in the manner of a pillar on one end of the plate-like stand of the outer bulb.

5. The lamp as claimed in claim 4,
wherein the mounting clip rests on the exhaust tube of the outer bulb.

6. The lamp as claimed in claim 1,
wherein the mounting clip has two fingers which protrude up at the longitudinal sides of the pinch seal.

7. The lamp as claimed in claim 1,
wherein the feed line is manufactured from steel, and the outer power supply line is manufactured from molybdenum.

8. The lamp as claimed in claim 7,
wherein the feed line is manufactured from nickel-plated steel.

9. The lamp as claimed in claim 1,
wherein the lamp is a halogen incandescent lamp.

10. The lamp as claimed in claim 9,
wherein the lamp is a halogen incandescent lamp configured for operation on a high or medium voltage.

11. A method for producing an electric lamp,
the electric lamp comprising:
an outer bulb and
a base fastened thereto and
a longitudinal axis,
the outer bulb surrounding a built-in lamp, which is equipped with a pinch seal with two narrow sides and two broad sides, from which at least one outer power supply line protrudes,
the outer power supply line being electrically conductively connected for its part to a feed line protruding up from the base, the feed line being held in a plate-like stand, the built-in lamp being held in the outer bulb by a cementless connecting means in the form of a mounting clip,
wherein an electrical connection between an outer power supply line and a feed line is ensured by virtue of the fact that a first one of these two component parts is bent back in the form of a bow, while the second of these component parts is bent back in the manner of a loop and is suspended in the bow;
the method comprising:
bending the first of these two component parts back in the form of a bow, while the second of these component parts is bent back through approximately 90° in the form of a loop; and
suspending the built-in lamp on the loop, then bending back the loop and suspending in the bow.

12. The method as claimed in claim 11, further comprising:
then compressing one of the component parts.

* * * * *